Oct. 13, 1959  R. A. CRESSWELL ET AL  2,908,799
METHOD AND APPARATUS FOR ELECTRIC ARC EROSION
Filed Jan. 20, 1958
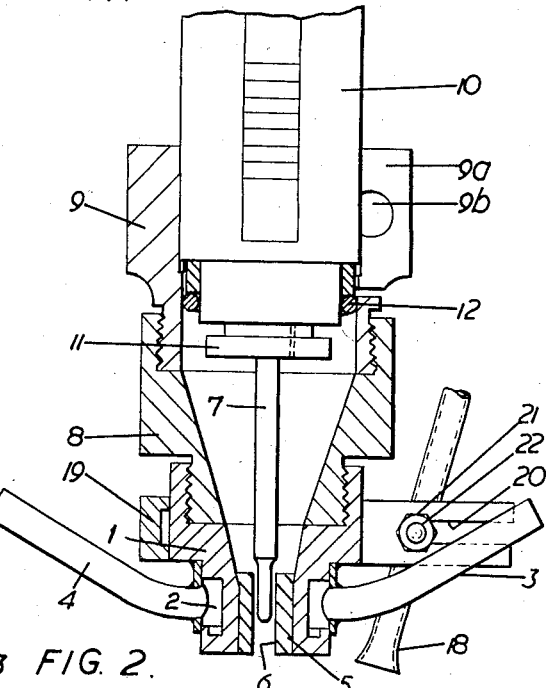
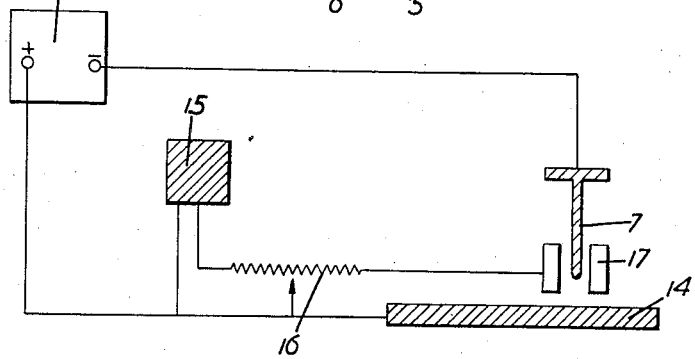
Inventor
JAMES RONALD BRADSHAW
ROBERT ARTHUR CRESSWELL
By
Aaron R. Townshend Attorney

United States Patent Office 2,908,799
Patented Oct. 13, 1959

2,908,799

METHOD AND APPARATUS FOR ELECTRIC ARC EROSION

Robert Arthur Cresswell, Tadworth, and James Ronald Bradshaw, West Dene, Brighton, England, assignors to The British Oxygen Company Limited, a company of Great Britain Application January 20, 1958, Serial No. 710,126

Claims priority, application Great Britain January 31, 1957

10 Claims. (Cl. 219—69)

This invention relates to a method and apparatus for the cutting of metals by electric arc erosion and is an improvement in or modification of the invention disclosed in our copending patent application No. 682,404, filed September 6, 1957.

In the cutting of metals by means of electric arc erosion, an electric arc established between a substantially non-consumable electrode, for example a tungsten electrode, and a workpiece to be cut, passes through a passage in a nozzle together with a high velocity stream of shielding gas which may consist of an an inert gas or a mixture of inert and reducing gases according to the nature of the metal to be cut. A process of this nature is disclosed in our copending patent application No. 640,546 filed February 15, 1957.

Owing to the intense heat and the erosive nature of the fumes produced during operation of this process, head assemblies such as are used for electric arc welding using a non-consumable electrode have been found to be not entirely suitable for this use owing to their short life. Our copending patent application referred to above, includes a claim 1 which claims a head assembly for and electric arc erosion cutter comprising a housing having a replaceable shielding nozzle of heat- and corrosion-resisting material defining a passage about a non-consumable electrode supported within the housing with its tip extending into or through said nozzle, connections for supplying shielding gas to the housing to flow around the electrode and through the passage, a secondary electrode for subjecting the shielding gas to ionization before it leaves said nozzle and connections to supply electric current to the non-consumable and secondary electrodes.

It has been observed during the cutting by electric arc erosion of certain metals, particularly those with a relatively low thermal conductivity such as stainless steel, that there is a tendency for the molten metal to run along the bottom edge of each side of the cut and bridge the cut. Further, dross sometimes adheres to the bottom edge of the sides of the cut, and the removal of the dross and the bridging metal necessitates a cleaning operation after cutting has been completed.

According to one aspect of the present invention in a head assembly for an electric arc erosion cutter as claimed in patent application No. 682,404, we provide an auxiliary nozzle positioned in proximity to the replaceable shielding nozzle to direct a jet of fluid into a cut formed by the electric arc.

Preferably the auxiliary nozzle is positioned adjacent the nozzle in an adjustable manner. Alternatively the replaceable shielding nozzle and the auxiliary nozzle may be relatively fixed, and these members may be formed in a single member. The auxiliary nozzle may be mounted on the nozzle.

The outlet opening of the auxiliary nozzle may be elongated, the longer dimension of the outlet opening being arranged to extend longitudinally of the cut.

The auxiliary nozzle may be disposed with its outlet opening close to the bottom edge of the cut.

According to another aspect of the present invention, in a method for the cutting of metals by electric arc erosion in which an electric arc established between a substantially non-consumable electrode and a workpiece to be cut, passes through a restricted nozzle together with a high velocity stream of shielding gas which may consist of an inert gas or a mixture of inert and reducing gases, a jet of fluid is directed into the cut and in proximity to the electric arc to remove unwanted material from the cut.

The fluid may be a gas, and it is preferred to use gases which produce from 2% to 50% of oxygen in the jet passing through the cut. Preferred gases are compressed air and carbon dioxide.

One construction of head assembly for an electric arc erosion cutter modified in accordance with the present invention will now be described by way of example with reference to the two figures of the accompanying drawings in which:

Figure 1 shows a sectional view of the assembly taken along the axis of the electrode, and Figure 2 shows a circuit diagram of the connections for the cutter.

Referring now to Figure 1 of the drawings, the head assembly consists of a tubular housing having, at the end intended during operation to be in proximity to the workpiece, an annular nozzle 1 formed mainly of copper with an encircling fluid cooling passage 2 communicating with inlet and outlet conduits 3 and 4. The nozzle includes a replaceable nozzle insert 5 of electrographite having a bore 6 coaxial with the assembly. This bore is of slightly greater cross-section than the tip of the non-consumable electrode 7 which is mounted coaxially of the assembly. As an alternative to using a replaceable nozzle insert 5 this portion may be integral with the annular nozzle 1.

The nozzle 1 is mounted by means of screw threads on a body member 8 which is similarly mounted on an adaptor 9 whereby the assembly may be secured to the insulated body 10 of a conventional welding head used for inert gas shielded arc welding with a non-consumable electrode. The upper part of the adaptor includes a split ring 9a which is arranged to be clamped to the body 10 by a bolt (not shown) passing through holes 9b in the ring. An O-ring 12 is provided to prevent the flow of cooling water into the housing. It will be noted that the interiors of the body member 8 and the nozzle 1 are of convergent cross-section in the direction of the nozzle to direct shielding gas towards the bore 6 without turbulence.

The electrode 7 is mounted coaxially within the housing by a support member 11 adapted to be carried by the body 10. This support member 11 is provided with passages or bores through which shielding gas may flow to the interior of the housing and around the electrode 7, and may be made of an oxide or oxides of aluminium, zirconium, silicon or magnesium. If the support member 11 is of suitable material, electric current for the electrode 7 may be fed to the electrode by way of this member. Alternatively conventional electrical connections within the body 10 may be used to feed electric current to the electrode 7. These electrical connections may permit axial adjustment of the electrode 7 for initial adjustment and for compensation for loss of the electrode in operation, which may occur in arduous service even though the electrode is substantially non-consumable.

It will be noted that in the construction shown in Figure 1, the tip of the electrode 7 is disposed within the bore 6 of the nozzle insert 5. An annular passage for the flow of shielding gas around the electrode is thus provided within the nozzle 1 and its insert 5. In operation, an electric arc is established between the tip of the electrode 7 and a workpiece 14 (see Figure 2) by way of the bore 6, and shielding gas flows from the annular passage around the electrode at high speed through the bore towards the workpiece.

For the purpose of ionising the shielding gas an electric discharge is set up between the electrode 7 and a secondary electrode. In the present assembly the nozzle 1 and nozzle insert 5 act as a secondary electrode, high frequency electric current being supplied to the nozzle 1 by way of the conduit 4 which is made of electrically conductive material or has a conductor incorporated in it. In some applications the high frequency electric current may be switched off after the cutting arc has been established.

Reference to Figure 2 will indicate how electric current is derived from a direct current source 13 and fed to an electric arc established between the electrode 7 and a workpiece 14, high frequency current from a source 15 such as a spark-gap type oscillator being fed to pilot arc between the electrode 7 and the workpiece 14. A resistor 16 is necessary in the pilot arc circuit. The optimum value for the part of this resistance connected between the nozzle 1 and workpiece 14 varies according to the shielding gas used; for argon the value is about 15 ohms, for nitrogen it is about 3 ohms. In accordance with the present invention, an auxiliary nozzle 18, of refractory material such as cemented carbide of tungsten is positioned in proximity to the nozzle 1 and arranged to direct a jet of fluid into the cut behind the arc. The auxiliary nozzle 18 is mounted on the nozzle 1 by means of a collar member 19 which embraces the nozzle 1 and is slotted at 20 to receive a screw-threaded stud 21 secured to the auxiliary nozzle 18. A retaining nut 22 co-operates with the stud 21 to clamp the collar member 19 to the nozzle 1 and to maintain the auxiliary nozzle 18 in a desired position relative to the nozzle 1. The auxiliary nozzle 18 may be of elongated form with the longer dimension of the outlet opening in line with the cut. Thus, this nozzle may be of fish-tail form in side elevation as shown, the outlet opening of this nozzle having internal dimensions of 3/8 inch long by 9/64 inch wide. The distance apart of the axes of the nozzle 1 and the auxiliary nozzle 18 may be from ½ inch to 1 inch and during operation the auxiliary nozzle may be parallel to or inclined to the nozzle 1. In the drawing, the auxiliary nozzle 18 is inclined forwardly. Preferably the nozzle outlet should be close to the bottom edge of the cut. Thus with thick workpieces the auxiliary nozzle 18 will be arranged to extend into the cut.

When cutting is being effected, an electric arc is established between the tip of the electrode 7 and the workpiece 14 being cut, use being made of high frequency electric discharge between the auxiliary electrode and the electrode 7 for initiating the arc, and a shielding gas is supplied through the housing to the nozzle 1 for shielding the arc. The head assembly is moved relatively to the workpiece 14 to maintain the electric arc and cut the workpiece, and the auxiliary nozzle 18 moves relatively to the workpiece behind the nozzle 1 along the line of the cut. The shielding gas passed through the nozzle 1 may be inert and reducing gases. By the term "inert gas" we mean a gas which will not have any appreciable effect on the electrode or on the metal being cut in any particular electric cutting operation. The shielding gas may consist of nitrogen alone or a mixture of between 5% and 75% by volume of hydrogen and at least one of the gases selected from the group comprising nitrogen, argon, carbon dioxide and hydrocarbons gaseous at normal atmospheric temperature such for instance as methane, propane or acetylene.

To prevent or reduce the formation of dross or bridging material at the bottom edge of each side of the cut, a jet of fluid is directed into the cut behind the electric arc during cutting by the auxiliary nozzle 18. This fluid, which is preferably a gas, will generally consist of compressed air or carbon dioxide particularly when ferrous materials are being cut. Other fluids, for example, water, oxygen, hydrogen, nitrogen or argon, may have an effect in clearing bridging metal from the cut but it has been found that compressed air and carbon dioxide are far superior in eliminating the formation of dross at the bottom edge of the cut without adversely affecting the cut surfaces. It is believed that the mechanism of dross removal when using these proffered gases is more than just a physical ejection of molten metal. Thus it appears that a limited amount of oxidation of the molten metal by the jet of gas is advantageous. The metal removal may be faciliated by the additional heat of oxidation and by the effect on the surface tension of the molten metal by the oxidation. Other gases or gas mixtures capable of providing from 2 to 50 percent of oxygen in the jet of gas as it passes through the cut may also be used if superior results are required.

Numerical data for three typical applications of the method will now be given by way of example.

Example 1

A 2-inch thick stainless steel plate was cut at a speed of 10 inches per minute. The shielding gas consisted of a mixture of nitrogen and hydrogen in the proportion of 3 to 1, respectively, supplied at the rate of 80–100 cubic feet per hour.

The auxiliary nozzle was supplied with air at a pressure of 25 pounds per square inch and a rate of 150 cubic feet per hours. The arc voltage was 70 volts and the current 500/600 amperes direct current, the electrode being connected to the negative pole of the supply.

Example 2

1-inch thick aluminium plate was cut at a speed of 30 inches per minute. The shielding gas consisted of a mixture of nitrogen and hydrogen in a proportion of 3 to 1, respectively, and was supplied at a rate of 80 cubic feet per hour.

The auxiliary nozzle was supplied with nitrogen at a pressure of 5 pounds per square inch and a rate of 150 cubic feet per hour. The arc voltage was 75/70 volts and the current 300/350 amperes direct current, the electrode being connected to the negative pole of the supply.

Example 3

1-inch thick stainless steel plate was cut at a speed of 25 inches per minute. The shielding gas consisted of a mixture of nitrogen and hydrogen in a proportion of 3 to 1, respectively, and was supplied at a rate of 80–100 cubic feet per hour.

The auxiliary nozzle was fed with water at a rate of 50–60 gallons per hour. The arc voltage was 70 volts and the current intensity 450/500 amperes direct current, the electrode being connected to the negative pole of the supply.

In each application the cut surfaces produced were clean, even and completely free from dross and no bridging of the cut occurred.

What we claim is:

1. A head assembly for an electric arc erosion cutter which comprises a tubular housing, a non-consumable rod electrode supported coaxially within the housing, a nozzle at one end of the housing defining a passage about the tip of the rod electrode, connections for supplying shielding gas to the housing from which it can flow around the tip of the rod electrode through the passage towards a workpiece being cut, a secondary electrode for subjecting the shielding gas to ionisation before it leaves the nozzle, connections to supply electric current to the rod and secondary electrodes, and an auxiliary nozzle positioned in proximity to the nozzle to direct a jet of fluid into the cut formed in a workpiece by an electric arc established between the rod electrode and the workpiece.

2. A head assembly for an electric arc cutter as claimed in claim 1, wherein the auxiliary nozzle is positioned adjacent the nozzle in an adjustable manner whereby the direction of the jet may be varied in relation to the nozzle.

3. A head assembly for an electric arc erosion cutter as claimed in claim 1, wherein the auxiliary nozzle is mounted on the nozzle.

4. A head assembly for an electric arc erosion cutter as claimed in claim 1, wherein the outlet opening of the auxiliary nozzle is elongated, the longer dimension of the outlet opening being arranged to extend longitudinally of the cut.

5. A head assembly for an electric arc erosion cutter as claimed in claim 1, wherein the auxiliary nozzle is arranged to be disposed with its outlet opening close to the bottom edge of the cut.

6. In a method of cutting metals by electric arc erosion which comprises establishing an electric arc between a substantially non-consumable electrode rod and a workpiece by way of a nozzle which defines a passage about the tip of the electrode rod, supplying shielding gas to flow around the tip of the electrode rod through the passage towards the workpiece, ionising the shielding gas, and moving the electrode rod relatively to the workpiece along the line of cut to maintain the electric arc and cut through the workpiece, the improvement which consists in directing a jet of fluid into the cut so formed in proximity to the electric arc thereby removing dross and any unwanted metal which has built up on the bottom edges of the cut sides of the workpiece behind the electric arc during the cutting operation.

7. A method for the cutting of metals by electric arc erosion as claimed in claim 6, wherein the fluid is a gas.

8. A method for the cutting of metals by electric arc erosion as claimed in claim 7, wherein the gas is such as to produce from 2 to 50 percent of oxygen in the jet passing through the cut.

9. A method for the cutting of metals by electric arc erosion as claimed in claim 8, wherein the gas is compressed air.

10. A method for the cutting of metals by electric arc erosion as claimed in claim 8, wherein the gas is carbon dioxide.

References Cited in the file of this patent

UNITED STATES PATENTS

| | | |
|---|---|---|
| 1,324,337 | Chapman et al. | Dec. 9, 1919 |
| 1,436,557 | Wysong | Mar. 21, 1922 |
| 2,381,355 | Laughton | Aug. 7, 1945 |
| 2,620,422 | Volff | Dec. 2, 1952 |
| 2,702,846 | Breymeier | Feb. 22, 1955 |
| 2,796,509 | Blake | June 18, 1957 |
| 2,806,124 | Gage | Sept. 10, 1957 |
| 2,821,615 | Fannon | Jan. 28, 1958 |

FOREIGN PATENTS

| | | |
|---|---|---|
| 143,331 | Great Britain | May 27, 1920 |
| 731,953 | Great Britain | June 15, 1955 |